(12) United States Patent
Smith

(10) Patent No.: US 7,413,141 B1
(45) Date of Patent: Aug. 19, 2008

(54) GAS TURBINE ENGINE FUEL CONTROL SYSTEM AND REGULATING VALVES THEREFOR

(75) Inventor: Trevor S Smith, Sutton Coldfield (GB)

(73) Assignee: Goodrich Control Systems Limited, Luton, Bedfordshire (GB)

( * ) Notice: Subject to any disclaimer, the term of this patent is extended or adjusted under 35 U.S.C. 154(b) by 0 days.

(21) Appl. No.: 07/526,797

(22) Filed: May 2, 1990

(30) Foreign Application Priority Data

May 10, 1989 (GB) .................................. 8910701.5

(51) Int. Cl.
*B64B 27/00* (2006.01)
*F02K 3/10* (2006.01)

(52) U.S. Cl. .......................... 244/53 R; 60/241; 60/243; 60/261

(58) Field of Classification Search .................. 60/241, 60/243, 261, 39.094; 244/53 R
See application file for complete search history.

(56) References Cited

U.S. PATENT DOCUMENTS

| 2,520,434 | A | * | 8/1950 | Robson | ........................ | 60/261 |
| 3,591,968 | A | * | 7/1971 | Arnett | ........................... | 60/243 |
| 4,370,854 | A | * | 2/1983 | Williams | ...................... | 60/261 |

FOREIGN PATENT DOCUMENTS

| EP | 0192037 | 8/1986 |
| GB | 657213 | 9/1951 |
| GB | 853706 | 11/1960 |
| GB | 1263587 | 2/1972 |
| GB | 1293672 | 10/1972 |
| GB | 1305613 | 2/1973 |
| GB | 1395690 | 5/1975 |
| GB | 1423361 | 2/1976 |
| GB | 1423362 | 2/1976 |
| GB | 2012367 A | 7/1979 |
| GB | 2014758 A | 8/1979 |
| GB | 2184169 A | 6/1987 |
| GB | 2189054 A | 10/1987 |

OTHER PUBLICATIONS

British Search Reports 9005906.

* cited by examiner

*Primary Examiner*—John W Eldred
(74) *Attorney, Agent, or Firm*—Nixon & Vanderhye P.C.

(57) ABSTRACT

A fuel control system for reheat burners of a gas turbine engine has a plurality of metering valves for respective burners, and throttle valves in series with the respective metering valves. A pressure regulating valve is provided for introducing pressurized fuel into fuel manifolds downstream of the respective throttle valves when the metering and throttle valves are shut. The pressure regulating valve also acts to relieve pressure in low pressure parts of the system when the latter is closed down and to prevent excessive temperature rise at the inlet of a fuel supply pump. The metering valves include pressure return ports which communicate with the metering valve outlets when those valves are shut.

8 Claims, 7 Drawing Sheets

GAS TURBINE ENGINE FUEL CONTROL SYSTEM AND REGULATING VALVES THEREFOR

BACKGROUND OF THE INVENTION

1. Field of the Invention

This invention relates to valves for regulating fluid flows and fluid pressures, and to gas turbine engine fuel control systems incorporating such valves.

2. Discussion of Prior Art

It is known to provide metering valves for fluids in which a control element is moved in response to variations in a servo-pressure, the servo-pressure being regulated by a valve which is energised by an electric force motor. It is a disadvantage of such known valves that failure of the force motor or its current supply may result in rapid change in the servo-pressure and consequent rapid movement of the valve control element away from its previously selected position. The present invention describes a metering valve arrangement in which this disadvantage is overcome.

SUMMARY OF THE INVENTION

Reheat systems for gas turbine engines are not normally operated for the whole time that the engine is running. Additionally, high engine operating temperature during reheat operation may cause the fuel in the reheat system to boil and to empty the system when reheat is shut off. If the system is allowed to empty, or partly empty, it will not respond sufficiently quickly when reheat is selected. It is an object of a further aspect of the invention to provide a reheat system in which the fuel supply manifolds are maintained primed with fuel at a pressure which is sufficient to prevent boiling.

According to one aspect of the invention a fuel control system for the reheat burners of a gas turbine engine comprises a source of pressurized fuel, a plurality of metering valves for regulating fuel flow from said source to respective ones of a plurality of burner manifolds, and means operable when one of said metering valves is shut, for introducing fuel at a predetermined reference pressure into the manifold associated with said one valve.

When a gas turbine engine main fuel system is shut down, heat flows from the engine or a rise in ambient temperature may expand fuel which is isolated between shut-off valves in a low pressure part of the fuel supply system, causing damage to that part of the system.

It is a still further object of the invention to provide a control valve for priming the engine reheat manifolds which will also act to relieve pressure in low pressure parts of the system when the engine is shut down.

According to a further aspect of the invention there is provided a valve for regulating pressure of a fluid, comprising a housing having first and second ports for connection to a fluid pressure source and a low pressure respectively, an outlet port communicating with said first port, a control element for regulating flow between said first and second ports, and a device for urging said control element to increase said flow in response to an increase in pressure at said first and outlet ports.

When a fluid flow control valve is used as a metering valve in a gas turbine engine fuel control system there is commonly provided a separate valve which is opened as the metering valve is shut, to return high pressure fuel to a drain line, thereby to reduce system pressure. It is desirable to reduce the amount of fuel discharged to the drain line, to minimise either the size of a drain tank, or the quantity of fuel discharged overboard. It is a further object of the invention to provide a fuel metering valve which incorporates means for reducing system pressure when the valve is shut.

According to a still further aspect of the invention a metering valve arrangement for regulating fuel flow from a pressure source to a gas turbine engine comprises a body having an inlet, an outlet and a return pressure port, and a control element movable within said body to regulate flow between said inlet and said outlet, said control element having a portion which uncovers said port to connect the latter to said outlet in a closed condition only of said control element in which flow between said inlet and said outlets prevented.

BRIEF DESCRIPTION OF THE DRAWINGS

An embodiment illustrative inventions will now be described by way of example only and with reference to the accompanying drawings in which:—

DETAILED DESCRIPTION OF THE PREFERRED EMBODIMENTS

Figure 1:
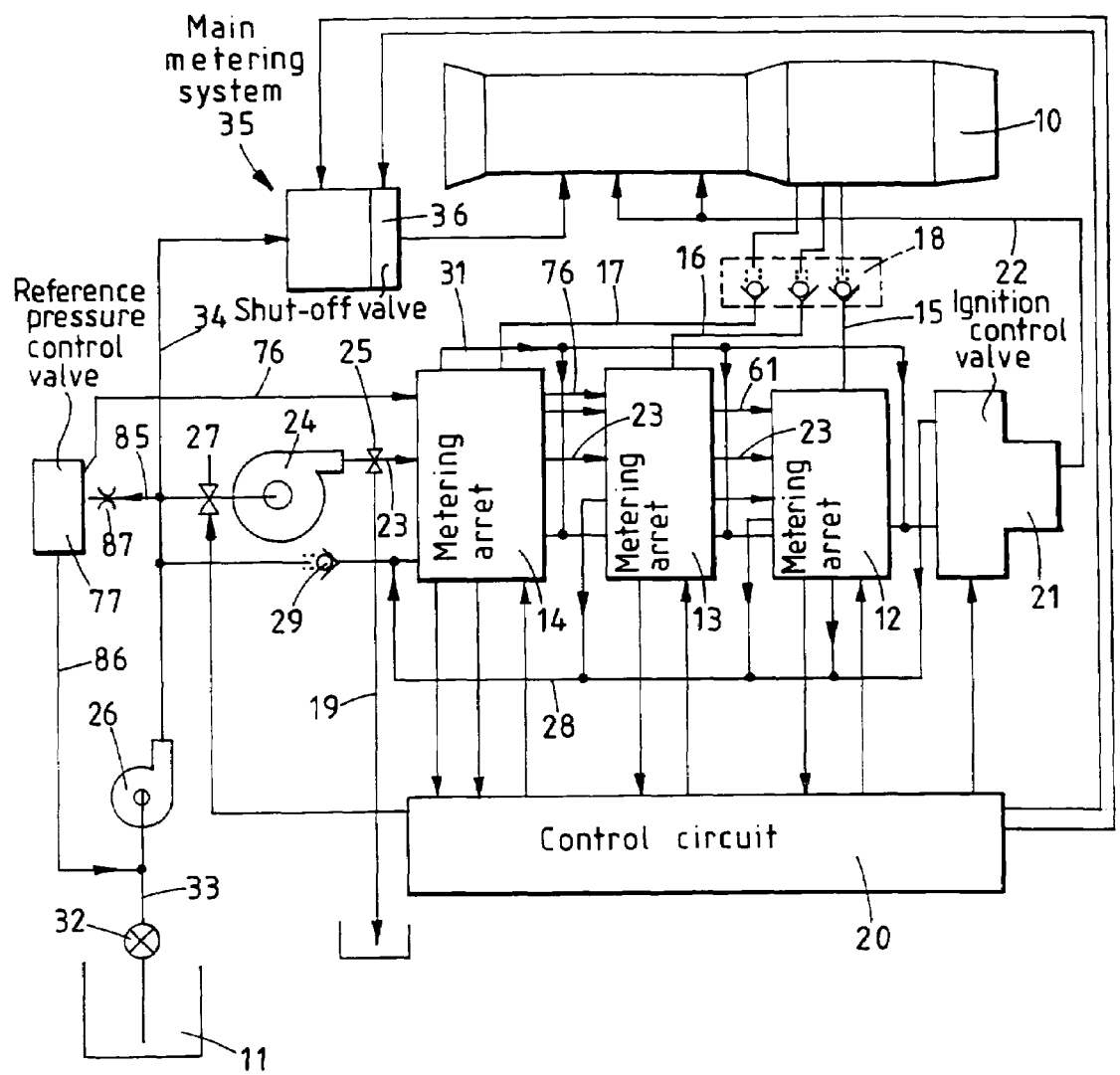
FIG. 1 is a block diagram of a control system for a gas turbine engine reheat fuel supply.

The gas turbine engine 10, shown in FIG. 1, has three groups of reheat burners, designated primary, bypass and core burners respectively. Fuel for these burners is supplied from a tank 11 by way of metering arrangements 12, 13 and 14 respectively. Outlet passages 15, 16, 17 for the arrangements 12, 13, 14 respectively pass to the engine 10 by way of an arrangement of spring-loaded shut-off valves 18. These valves 18 lift open at a predetermined pressure difference and act, in a manner to be described, as pressure relief valves during shut down of the reheat system. The arrangements 12, 13 and 14 are shown in more detail in FIGS. 2 to 4 respectively and are responsive to signals from an electrical control circuit 20. A device 21 is also responsive to control signals from the circuit 20 to deliver a measured quantity of fuel on a line 22 to the engine 10 to transfer flame from the engine combustion chamber to the reheat burners when the reheat system is switched on.

Figure 4:
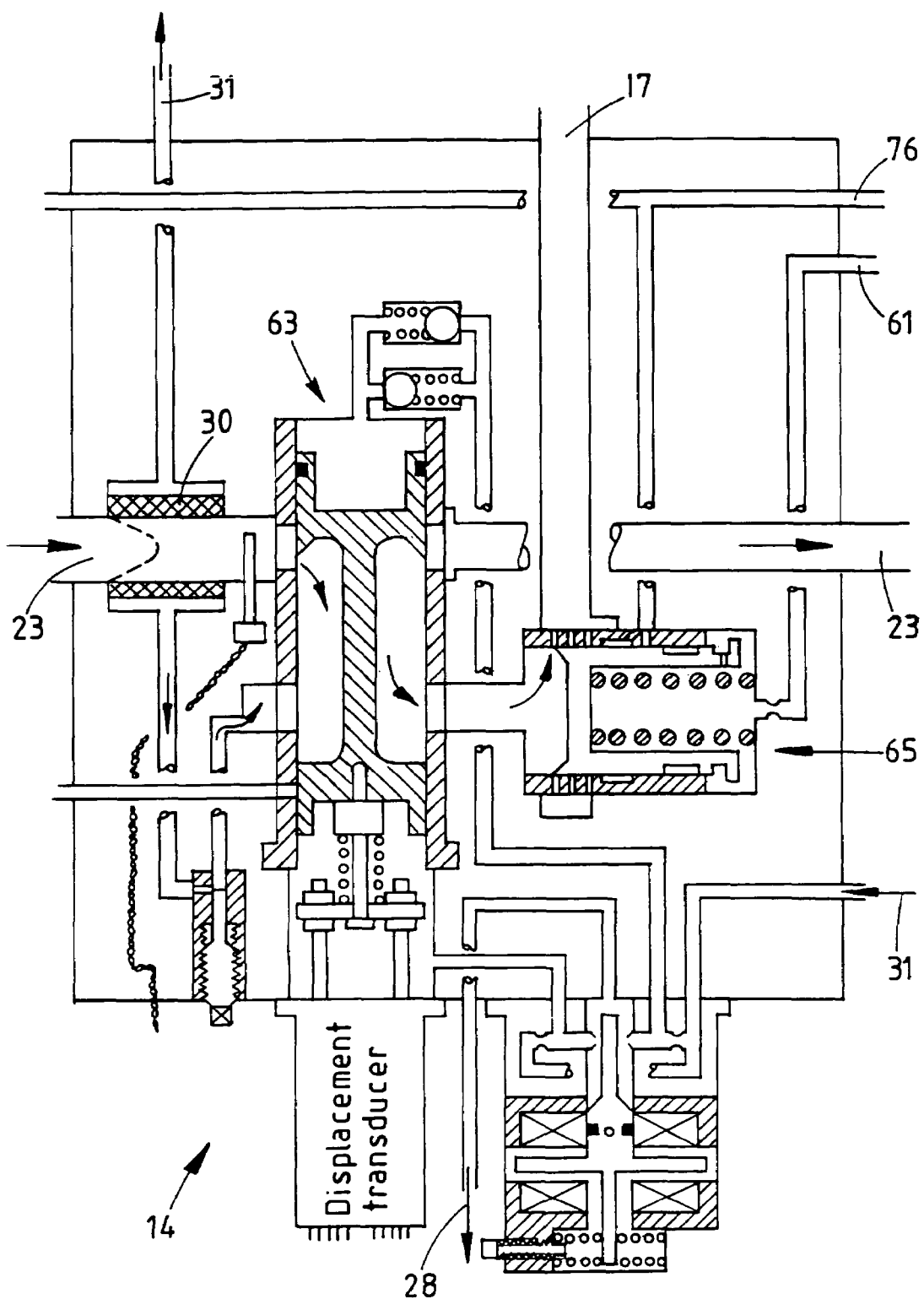

The metering arrangements 12, 13, 14 receive fuel on a common supply passage 23 from a centrifugal pump 24 by way of a valve 25 which is biased to connect the outlet of the pump 24 to a drain line 19, and is responsive to a predetermined level of delivery pressure from the pump 24 to connect the pump outlet to the passage 23 and to shut off the drain line 19. A low pressure pump 26 supplies fuel from the tank 11 to the inlet of the pump 24 by way of a line 34 and an electrically operated valve 27. A low pressure return line 28 communicates with the inlet of the pump 24 by way of a non-return valve 29. As shown in FIG. 4 the arrangement 14 includes a filter 30 from which high pressure fuel is supplied from the passage 23 to a line 31. A manually operable valve 32 in a line 33 between the tank 11 and the inlet of the pump 26 is shut when the engine 10 is shut down. The pump 26 also supplies fuel on the line 34 to a main metering system 35 which includes a shut-off valve arrangement 36, the system 35, including the arrangement 36, being responsive to signals from the circuit 20.

Figure 2:
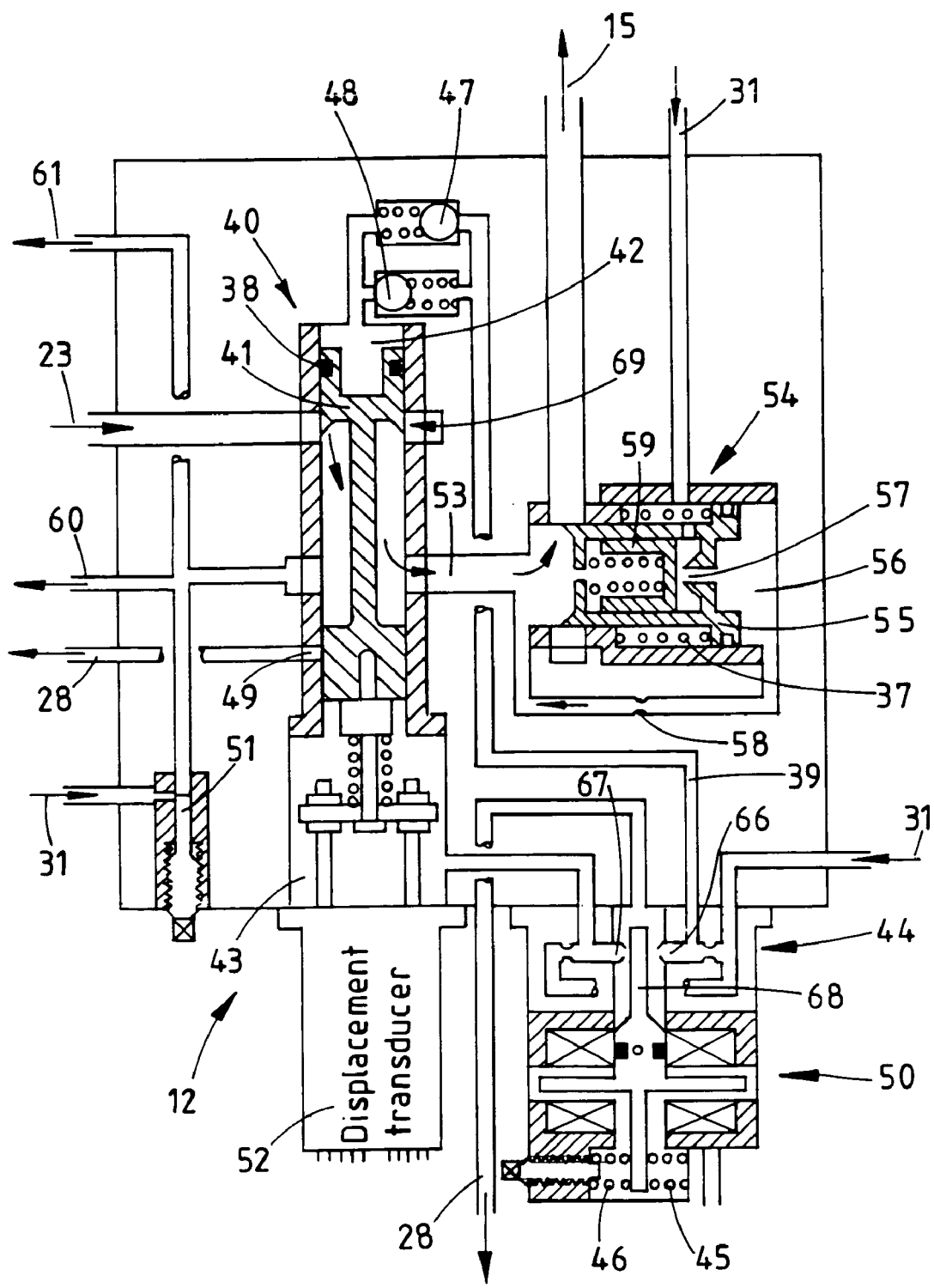
FIGS. 2, 3, and 4 show details of metering arrangements for respective groups of reheat burners of the engine, and forming parts of FIG. 1.

As shown in FIG. 2 the arrangement 12 includes a metering valve 40 having an inlet communicating with the passage 23 and a control element 41 for regulating flow between the passages 23 and 15. The element 41 is axially movable in response to a difference between servo-pressures in chambers 42, 43, these pressures being derived at ports 66, 67 by a flapper-controlled pilot valve 44 from the high and return pressures in lines 31 and 28 respectively. The flapper 68 of the valve 44 is biased to a null position by springs 45, 46.

The valve 44 communicates with the chamber 42 by way of a line 39 and parallel pressure relief valves 47, 48 which permit flow in respective opposite directions. The valves 47, 48 are set to lift at a low pressure difference, for example 138 kPa, which is nevertheless above the servo-pressure difference in the null condition of the valve 44. The springs 45, 46 are adjusted so that the difference between the pressure in line 39 and the pressures in chambers 42, 43 is very small when the valve 44 is in its null condition. The difference between the pressures in chambers 42, 43 is also very small when the valve 44 is operating, and in the steady-state condition of the valve 40 those pressures are substantially equal. The valve 44 is movable in either direction from its null position by a torque motor 50 which is controlled by the circuit 20 (FIG. 1). Thus, if the valve 44 adopts a null position as a result of failure of the motor 50 or its electrical supply, the servo-pressure difference across the valve 47, 48 will be insufficient to lift either of them and the element 41 will move from its position only as a result of a very slow leakage to or from the chamber 42, this leakage being through the gap in a piston ring 38. A stem on the control element 41 is coupled to a displacement transducer 52 which signals the position of the element 41 to the circuit 20. An adjustable restricted orifice 51 is located between the high pressure line 31 and the outlet port 53 of the valve 40, to provide compensation for manufacturing tolerances in the profile of the metering orifice 69 of the valve 40.

The outlet 53 of the valve 40 communicates with the passage 15 by way of a pressure drop regulating valve 54 whose control element 55 is biased open by a spring 37 and is responsive to pressure in a chamber 56 between a variable orifice 57 in the element 55 and a fixed restrictor 58. Flow through the orifice 57 is controlled by a piston 59 which is responsive to difference between the pressures in the outlet 53 and in the high pressure line 31, and is spring-loaded to shut the orifice 57. The valve 54 is dimensioned to provide a predetermined metering pressure drop across the valve 40, and regulates flow to the passage 15 to maintain that pressure drop constant. The pressure in the outlet 53 is applied to the metering arrangements 13, 14 through lines 60, 61 respectively. The valve 40 includes a port 49 through which fuel can flow to the return line 28 from the outlet 53 when the valve 40 is shut. The valve 29 (FIG. 1) allows this fuel to flow to the line 34 only when the pressure in line 28 is higher than that in line 34.

Figure 3:
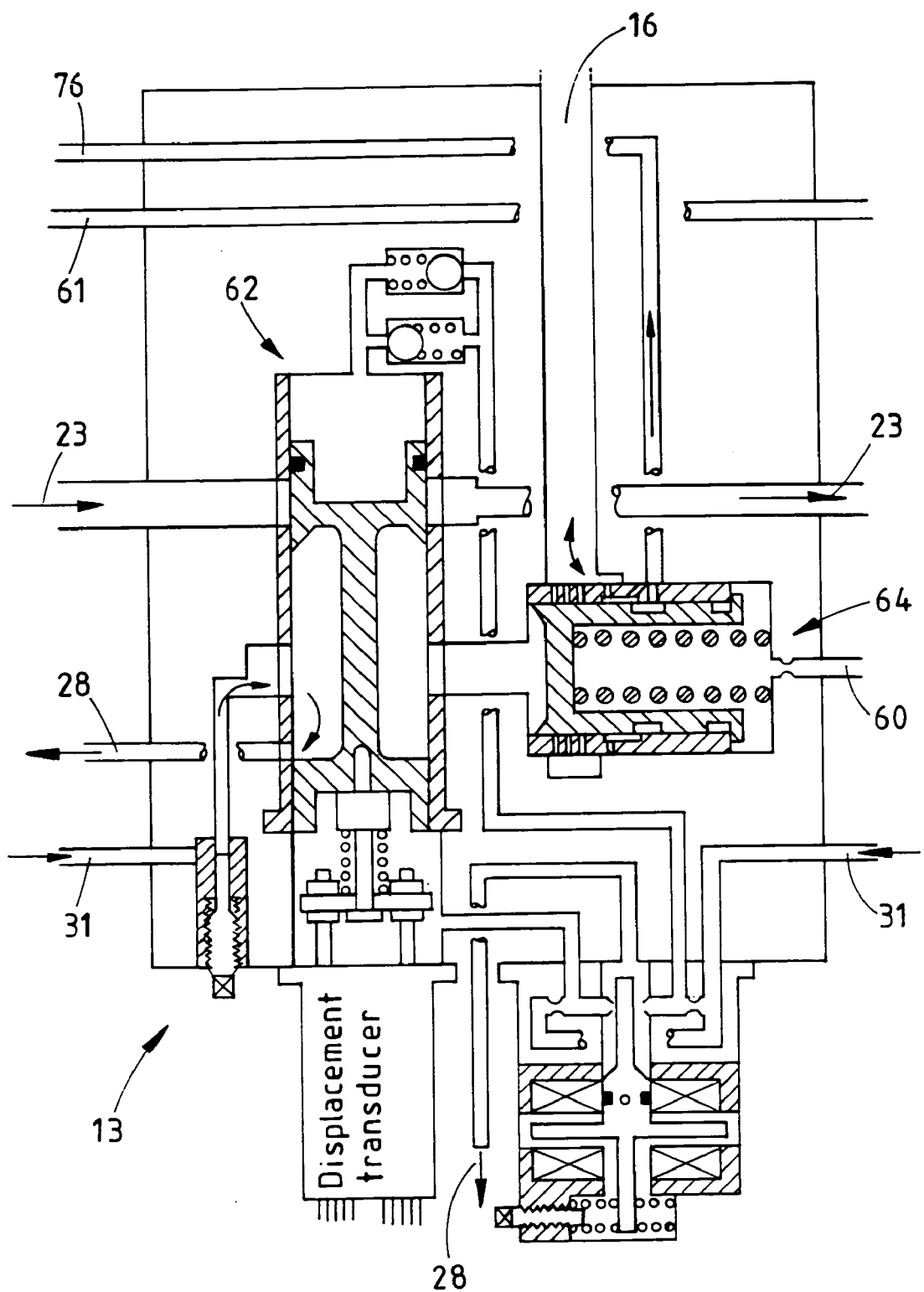

The arrangements 13, 14 are shown in FIGS. 3 and 4 and are generally similar to the arrangement 12, except in the sizes of their respective metering valves 62, 63, and will not be described in detail. The principal difference in the arrangements 13, 14 resides in their pressure drop control valves 64, 65 respectively, which are responsive to the pressure downstream of the valve 40, applied through the lines 60, 61. The valves 64, 65 are also responsive to the pressures downstream of the metering valves 62, 63. respectively. The arrangement is such that the pressures downstream of the valves 62, 63 are maintained equal to that downstream of the metering valve 40. Since the metering valves 40, 62, 63 have a common supply passage 23, the pressure differences across all of the metering valves are maintained equal to each other.

Figure 5:
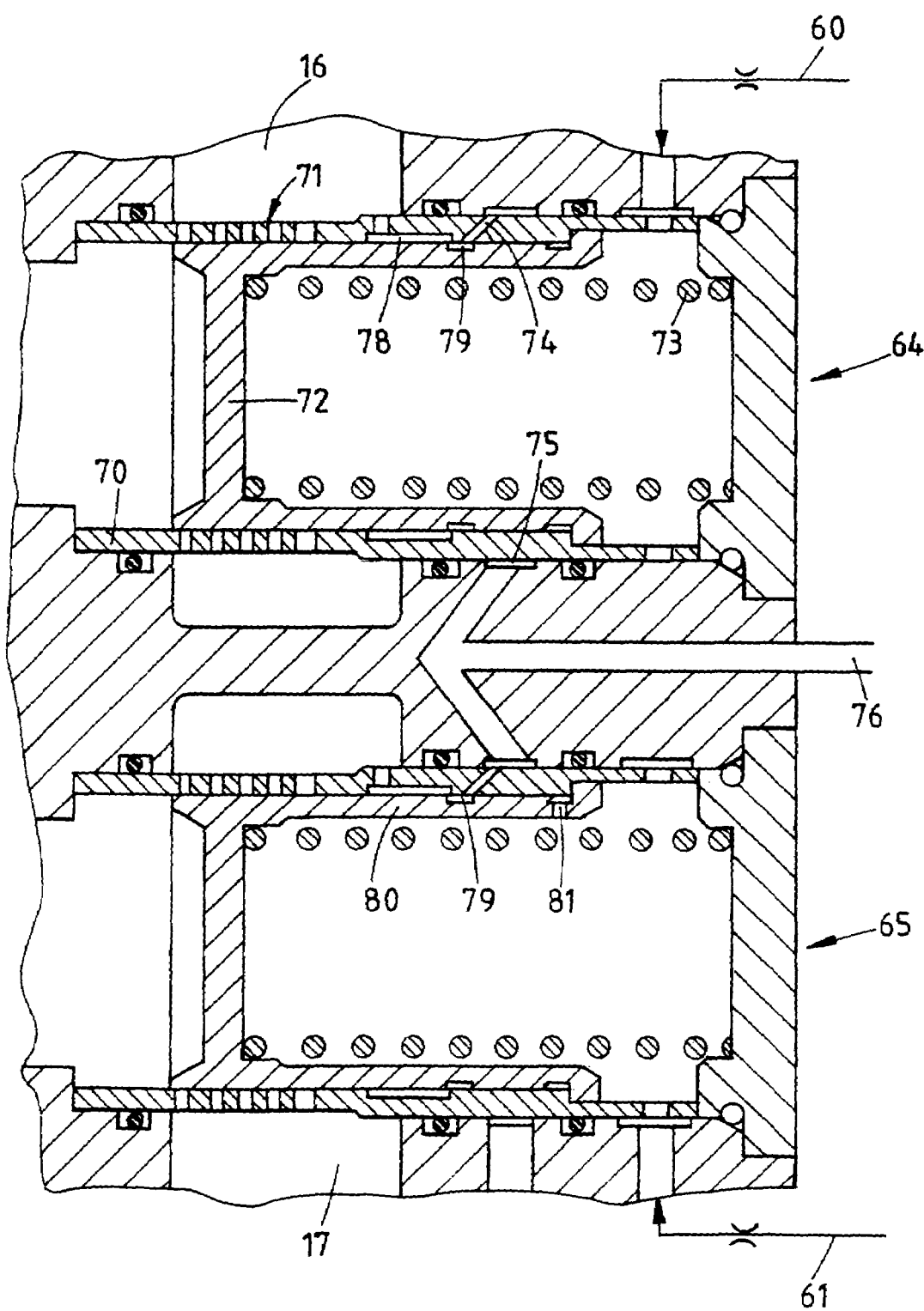
FIG. 5 is a detailed view, to an enlarged scale, of parts of the devices of FIGS. 2 and 3.

The valves 64, 65 are shown in more detail in FIG. 5. The valve 64 includes a sleeve 70 having ports 71 which communicate with the outlet passage 16. A control element 72 is slidable in the sleeve 70 and is urged towards a shut position by a spring 73. The sleeve 70 has a further port 74 which communicates by way of an annular passage 75 and a line 76 (see also FIGS. 1, 3 and 4) with a valve 77 (FIG. 1) which provides a constant reference pressure in the line 76. The sleeve 70 has an annular groove 78 which communicates with one of the ports 71. When the valve 64 is shut a further annular groove 79 in the element 72 interconnects the port 74 and the groove 78. In the shut condition of the valve 64 fuel can flow from the valve 77 (FIG. 1) through the line 76, passage 75, port 74 and grooves 78, 79 to apply the reference pressure to the outlet passage 16.

In its shut condition the valve 65 can supply the reference pressure in line 76 to the passage 17, and corresponds to the valve 64 except that the control element 80 of the valve 65 has an additional port 81 through which leakage flow from the groove 79, between the control element 80 and its surrounding sleeve, can enter the bore of the valve 65 and pass to the line 61. As described above the line 61 communicates with the line 60 and with the outlet 53 of the valve 40 (FIG. 2). Since the valve 54 is biased open, when the reheat system is in its shut down condition fuel from the line 61 can enter the outlet passage 15. With the reheat system shut down the valve 27 is shut and valve 25 (FIG. 1) is connected to the drain line 19, though the pumps 24, 26 continue running. The reference pressure in line 76, and applied to passages 15, 16, 17 is less than that at which the valves 18 (FIG. 1) will lift, so that when the reheat system is shut down no fuel reaches the reheat burners. When the reheat system is operated to shut the valve 62 (FIG. 3) and supply fuel to the primary and core burners only, the valve 64 also shuts and the reference pressure is applied to passage 16.

When the main fuel system and reheat system (FIG. 1) are shut down, the shut-off valve arrangement 36 and the valves 27, 32 will be shut. Fuel is therefore trapped in the lines 33, 34, 85, 86 and pump 26. Heat flow from the engine 10, or an increase in ambient temperature may expand the trapped fuel and result in damage to those parts of the system. The valve 77, in addition to providing the reference pressure in line 76, also serves to prevent unacceptable pressure rise in the low pressure zones of the fuel system.

Figure 6:
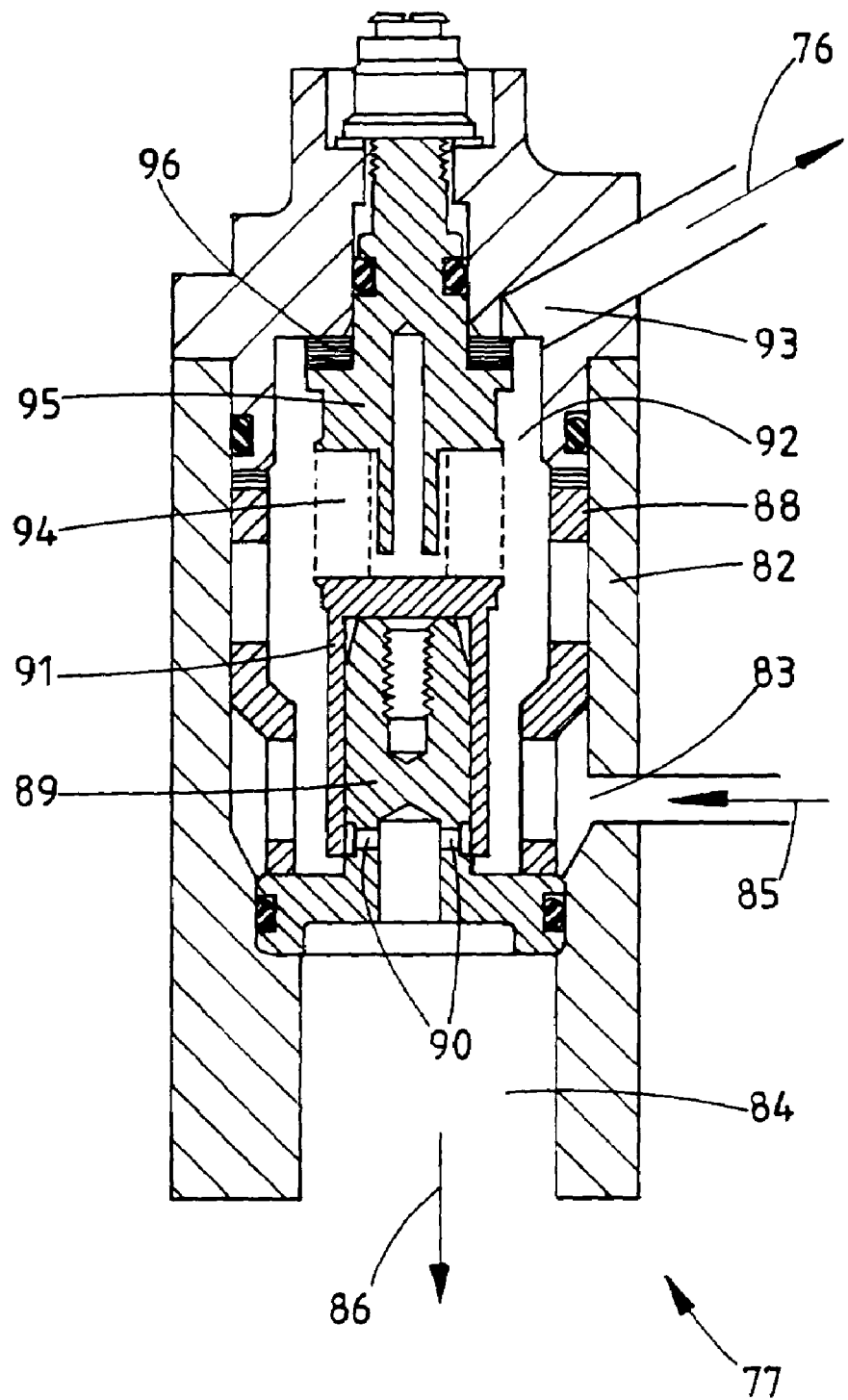
FIG. 6 shows a pressure control valve forming part of FIG. 1.

The valve is shown in detail in FIG. 6 and comprises a housing 82 which has first and second ports 83, 84 which communicate by way of respective lines 85, 86 with the outlet and inlet respectively of the pump 26. The line 85 includes a flow restrictor 87 (FIG. 1). A ported sleeve 88 is located within the housing 82 between one end thereof and a fixed ported stem 89. Ports 90 in the stem 89 communicate with the port 84. A valve sleeve 91 is sealingly slidable on the stem 89 to control flow through the ports 90. The interior of the sleeve 88 defines a chamber 92 which communicates with the line 76 by way of a third port 93 in the housing 82. An evacuated bellows device 94 in the chamber 92 urges the valve sleeve 91 to shut the ports 90 in the stem 89. The bias applied by the bellows device 94 is variable by means of a stem 95 whose position is axially adjustable by means of shim washers 96.

In use, fuel initially flows from the line 85 through the restrictor 87, port 83, chamber 92 and port 93 to the line 76. At a predetermined reference pressure in the line 76, set by the stem 95, the sleeve 91 is lifted to open the ports 90 and allow a part of the fuel in line 85 to return to the inlet of the pump 26. The valve 77 thereby maintains a regulated reference pressure in the line 76 for priming the supply passages 15, 16 17 when the reheat system is shut down. After priming the line 76 and elements downstream thereof are full of fuel. Since the reference pressure in line 76 is less than that at which the valves 18 (FIG. 1) will open, no fuel flows to the reheat burners. Fuel upstream of the valves 18 is maintained at a pressure sufficient to prevent boiling.

In a shut down condition of the engine 10, heat may cause fuel in the lines 33, 34, 85, 86 and in the pump 26 to expand. A rise in pressure in the line 85 is relieved by way of the line 76 and the valves 18. During partial operation of the reheat system the valves 62, 64 may be shut. Hot fuel from the outlet passage 16 may pass through the grooves 78, 79 and enter the reference pressure line 76. Even if the ports 90 are open, the hot fuel from line 76 is mixed with cool fuel from the line 85 before returning by way of the line 86 to the inlet of the pump 26. The fuel temperature at the pump inlet thus never rises sufficiently to boil, and will not become blocked by vapour.

Figure 7:
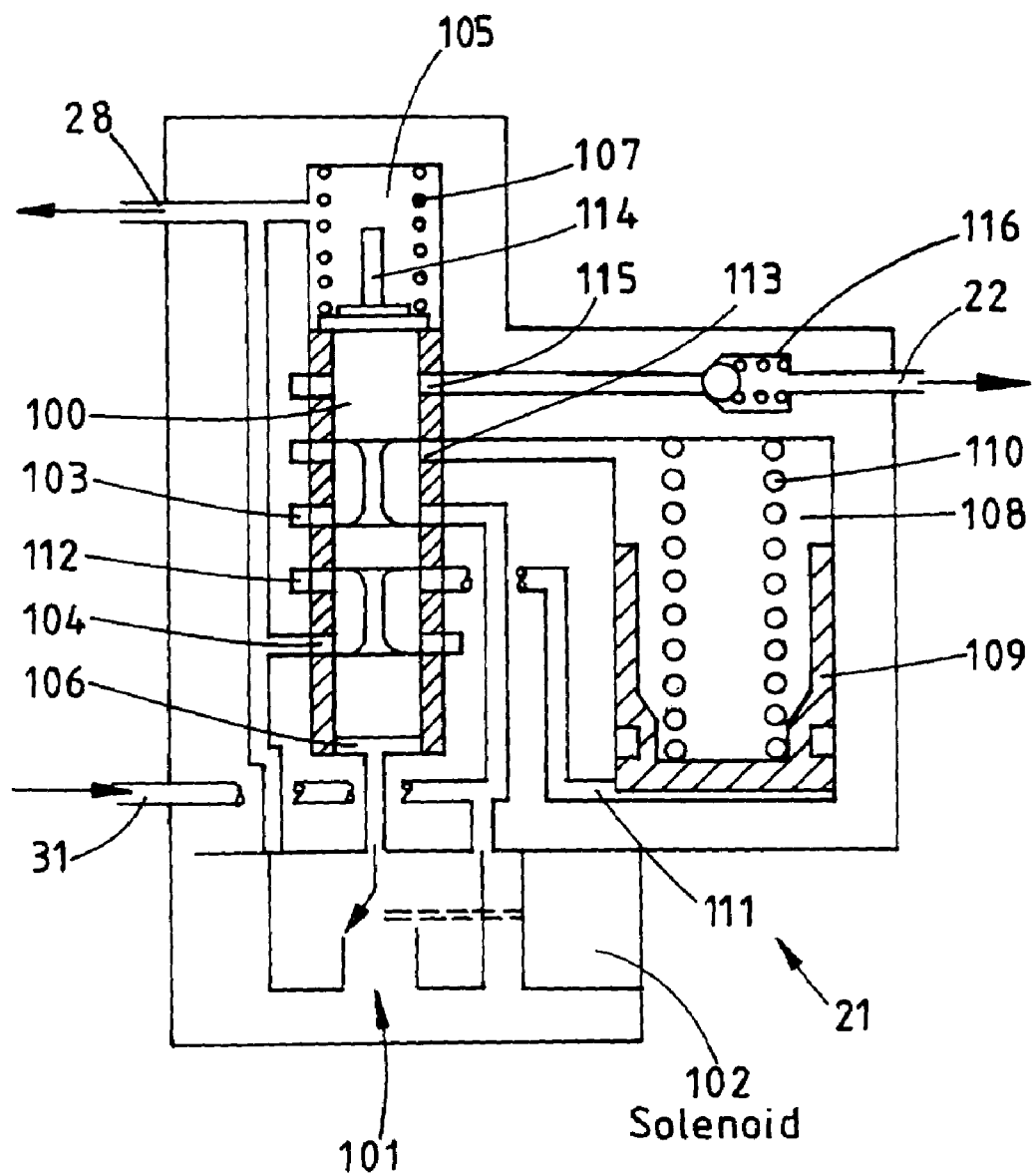
FIG. 7 shows a device for supplying a measured quantity of fuel for igniting the reheat burners.

The device 21 shown in FIG. 7 comprises a spool valve 100 and a change-over valve 101 operated by a solenoid 102. High pressure in line 31 is applied to a port 103 of the valve 100. A further port 104 and a chamber 105 at one end of the valve spool are connected to the low pressure return line 28. A chamber 106 at the other end of the spool is connected by the valve 101 to the return line 28 when the solenoid 102 is de-energised or to the high pressure line 31 when the solenoid 102 is energised on selection of reheat. The spool is biased by a spring 107 to connect the port 103 to a chamber 108 in which a piston 109 is slidable. The piston 109 is biased by a spring 110 to provide a maximum volume in the chamber 108 and the spring bias is opposed by the pressure in a chamber 111 which, in the de-energised condition of the solenoid 102 is connected to the low pressure line 28 through the port 104 and a port 112. In this condition the line 22 to the engine 10 is shut-off and the chamber 108 is charged with fuel from the line 31 through port 103 and a further port 113. The piston 109 is maintained in its charged position by the spring 110, in the absence of pressure in line 31, when the reheat system is shut down.

At reheat start-up after fuel flow to selected ones of the reheat burners has been established, the solenoid 102 is energised to apply the high pressure in line 31 to the chamber 106, moving the spool against the spring 107 to the full extent of its travel, as determined by an abutment 114, in which position the chamber 108 is isolated from line 31 and connected to line 22. At the same time the high pressure line 31 is connected to the chamber 111 through ports 103, 112, and the piston 109 moves to expel fuel in the chamber 108 to the line 22, through the ports 113, 115 by way of a non-return valve 116. The fuel so expelled passes to the engine combustion chamber and a location downstream thereof, resulting in a streak of flame between the combustion chamber and the selected burners, to ignite fuel at the latter.

When the reheat system is shut down, the valves 40, 62, 63 (FIGS. 2, 3 and 4) are shut. The pump inlet valve 27 (FIG. 1) is also shut, but the valve 25 continues to pass fuel to the passage 23 while the pump 24 empties, maintaining servo operating pressure on the line 31. In the fully shut conditions of valves 62, 63 the pressures upstream of valves 64, 65 respectively (FIG. 5) are lower than that in lines 60, 61, so that valves 64, 65 shut, stopping flow to the passages 16, 17 and establishing the reference pressure in those passages, as described above. In the shut condition of valve 40 the low pressure return port 49 therein is open and fuel flows from the line 31 to the return line 28 through the restrictor orifice 51, line 60 and port 49. The pressure drop between passage 23 and outlet 53 is greater than the predetermined metering pressure drop of valve 54, and that valve moves to reduce the pressure drop, shutting off flow to the passage 15. As the pump 24 empties via the orifice 51 and port 49 (FIG. 2), and their equivalents in the arrangements 13, 14, the pressure in line 31 falls to that in the return line 28, at which pressure in the line 31 the valve 25 connects the outlet of the pump 24 to the drain line 19. The low pressure in line 31 results in absence of servo pressure for the valve 54, which opens under influence of its spring. Reference pressure in line 76, which has already been established in passages 16, 17 is established in passage 15, as described above.

The invention claimed is:

1. A fuel control system for the reheat burners of a gas turbine engine, comprising:
    a source of pressurized fuel,
    a plurality of metering valve means for regulating fuel flow from said source to respective ones of a plurality of burner manifolds, and
    means, operable when one of said metering valve means is shut, for introducing fuel at regulated reference pressure into the manifold associated with said one valve means.

2. A system as claimed in claim 1 which includes a plurality of throttle valves between respective ones of said metering valve means and their respective manifolds, one of said throttle valves including ports which, when said throttle valve is shut, connect said reference pressure to the manifold associated with said one throttle valve.

3. A system as claimed in claim 2 in which said one throttle valve is operable when closed to connect said reference pressure to a further manifold of the engine.

4. A system as claimed in claim 1 which includes relief valves in the respective burner manifolds, said relief valves being arranged to lift at pressures greater than said reference pressure.

5. A system as claimed in claim 1, including a valve for regulating a pressure of a fluid, comprising a housing having a first port for connection to a fluid pressure source by way of a flow restrictor and a second port for connection to a low pressure, an outlet port communicating with said first port, a control element for regulating flow between said first and second ports, and a device for urging said control element to increase said flow in response to an increase in pressure at said first outlet port.

6. A system as claimed in claim 5 in which said device is a pressure-responsive bellows and there is provided means for adjusting the pressure at said outlet port at which said control element interconnects said first and second ports.

7. A fuel control system for the reheat burners of a gas turbine engine, comprising:
    a source of pressurized fuel;
    a plurality of metering valve means for regulating fuel flow from said source to respective ones of a plurality of burner manifolds;
    means, operable when one of said metering valves is shut, for introducing fuel at predetermined reference pressure into the manifold associated with said one valve means; and
    a plurality of throttle valves between respective ones of said metering valve means and their respective manifolds, one of said throttle valves including ports which, when said throttle valve is shut, connect said reference pressure to the manifold associated with said one throttle valve.

8. A system as claimed in claim 7 which includes relief valves in the respective burner manifolds, said relief valves being arranged to lift at pressures greater than said reference pressure.

* * * * *